United States Patent [19]
Peavey et al.

[11] Patent Number: 5,412,390
[45] Date of Patent: May 2, 1995

[54] APPARATUS AND METHOD FOR REDUCING CO-CHANNEL INTERFERENCE FROM A RADIO FREQUENCY SIGNAL

[75] Inventors: David L. Peavey, Fremont; Katherine A. Tieszen, Cupertino; Kristina Pagnini, Fremont; Fred E. Schader, San Jose; Timothy D. Stephens, Milpitas; Nicholas Cianos, Menlo Park; John R. Conkle, Los Gatos, all of Calif.

[73] Assignee: Delfin Systems, Santa Clara, Calif.

[21] Appl. No.: 110,884

[22] Filed: Aug. 24, 1993

[51] Int. Cl.$^6$ ............................................... G01S 5/02
[52] U.S. Cl. .................................. 342/417; 342/196; 342/56
[58] Field of Search ................. 342/417, 56, 113, 196; 455/278.1, 296

[56] References Cited

U.S. PATENT DOCUMENTS

| | | | |
|---|---|---|---|
| 4,214,316 | 7/1980 | Klemm | 455/141 |
| 4,234,880 | 11/1980 | Lipsky | 342/159 |
| 4,536,764 | 8/1985 | Freeman | 342/91 |
| 4,754,282 | 6/1988 | Edelblute et al. | 342/417 |
| 5,122,805 | 6/1992 | Peterman et al. | 342/26 |

*Primary Examiner*—Thomas H. Tarcza
*Assistant Examiner*—Dao L. Pham
*Attorney, Agent, or Firm*—Benman Collins & Sawyer

[57] ABSTRACT

A system for reducing co-channel interference includes a power spectrum analyzer which provides a spectral signal representative of an intermediate frequency signal from the receiver of a direction finding system. The system further includes threshold/window logic that, responsive to the comparison of threshold levels and spectral windows to the interfering signals, will provide stop and continue signals to an integrator. The integrator receives signals from the direction finding system and stops and starts integration of the output signal responsive to the threshold logic. In so doing, co-channel interference is substantially reduced.

15 Claims, 6 Drawing Sheets

APPARATUS AND METHOD FOR REDUCING CO-CHANNEL INTERFERENCE FROM A RADIO FREQUENCY SIGNAL

FIELD OF THE INVENTION

This invention relates to processing of a radio frequency signal for direction finding and more particularly to a method and apparatus for reducing co-channel interference of a radio frequency signal.

BACKGROUND OF THE INVENTION

The direction finding systems of today owe much to concepts related to radio direction finding learned over the first half of this century. However, over the past two decades, relatively inexpensive analog and digital processing tools have lead to the development of high performance, easy to use, direction finding devices that are viable for many applications.

While these new tools are derived from advances in commercial digital signal processing (DSP), there are technologies unique to direction finding (DF) systems that are of significant importance to such systems. The design of a complete DF system requires careful consideration of many factors ranging from frequency, propagation, and modulation to application and deployment. However, the most important direction finding fundamental is the method used to intercept and locate signals of interest (SOI).

As with any radio frequency signal intercepting system, the receivers and detectors are optimized for the particular signals of interest. In such systems certain design performance requirements such as size, weight and power are balanced against the key systems specifications: selectivity and sensitivity. One of the most critical parameters to be influenced by DSP functions are the computation of the bearing angle of the signal. The present patent application is directed towards influencing the computation of bearing angles. DSP plays a major role in improvement of the signal to noise ratio and computation of the quality factors, an indication of the effectiveness of the bearing measurement. Processing also considers calibration issues. Specifically, various antenna and equipment calibration methods use DSP to achieve and maintain the desired measurement accuracies on the order of a few degrees of true compass headings.

Finally, the DF system processor provides the man-machine interface. With new digital display technology, many additional capabilities have been added to the design of today's direction finding systems.

The functional features of the system include intercept search speed and operational performance as well as adaptability of the equipment to multiple applications. There are many types of advanced processing procedures and functions associated with DSP systems. In addition, these performance characteristics improve the direction finding systems.

However, the performance of even the latest direction finding systems is ultimately affected by the law of physics. The chance location of the direction finding (DF) equipment at a field site or on a platform may result in significant measurement errors. In some cases the deleterious effects of the site or platform can be mitigated either by moving the location or calibrating the error into the calculation.

In antenna array sampling techniques, various methods are used to achieve affordable multi-application system designs. These sampling methods determine the bearing angle of the radio signal so that the proper signal can be found.

Antenna array sampling methods, like those used in current pseudo-Doppler DF, are an attractive way of achieving affordable multi-application system designs. When combined with the latest signal processing methods and low-cost processors, array sampling techniques offer benefits that are comparable to earlier, very expensive system approaches.

DF antennas have aperture dimensions that are typically small, most less than half a wavelength. Today's electromagnetic modeling and computer-aided design tools allow engineers to design antennas that are relatively small and efficient over wide spectral bands. But the small aperture size of the antennas would make turning or steering techniques an ineffective means to locate the arriving signal bearing. Instead, three fundamental measurement parameters are used; amplitude, phase and Doppler frequency.

In the amplitude measurements, two sets of antennas with dipole-type patterns are arranged orthogonally. Signals arriving at the two antennas induce a voltage relative to the polarization and radiation pattern for each antenna. The bearing angle is derived from the ratio of the two signal amplitudes. Because simple amplitude measurements are made, a sense antenna (with an omni-directional pattern) is used to resolve the "180 degree" ambiguity in the bearing calculation.

Direct phase measurement methods for example, use a set of four antennas. Two antennas form one baseline. The relative phase differences of the induced voltages between the antennas define the bearing angles. Ambiguity in the bearing measurements, therefore, is not an issue.

Conceptually, at least, the Doppler measurement methods are straightforward. An antenna is rotated about a point at a given angular rate. As the antenna moves, it imposes a Doppler shift on the arriving signal. The magnitude of the Doppler shift is at a maximum as the antenna moves directly toward and away from the direction of the incoming wavefront. There is no apparent frequency shift when the antenna moves orthogonally to the wavefront. The bearing angle is therefore proportional to the relative position of the zero crossings of the Doppler-shifted signal. For many applications Doppler methods are not practical, since the system uses motors and moving components.

Although the amplitude and phase measurement methods are viable DF approaches, they too have some significant constraints. First, they must maintain amplitude and phase balance to minimize measurement errors. Maintaining amplitude and phase balance is especially challenging when the antennas are connected to the processor through the multiple amplitude-phase matched receivers and cable assemblies still used in older system architectures. The antennas and receivers are significantly more expensive as well. Add these factors to the complexity of the overall DF system design and the antenna array continues to be the major focus for new design challenges.

Computer and RF technology advances over the past 20 years have resulted in new tools and devices to create systems with a single receiver. Using one receiver in a system reduces the balancing errors, overcomes the complexities of amplitude-phase matched receivers and substantially reduces system cost. Hence, the system becomes more affordable.

There are various ways of designing a DF system with a single receiver, such as the RF combining subsystem approach. In this design, RF processing elements combine the outputs of the antenna elements and feed the combined RF output signal to a single receiver and DF processor.

An alternative approach uses RF sampling methods from an array of antennas. Here, an RF sampling (or commutating) switch samples each antenna and sends the combined samples to the receiver and DF processor. This sampling method simplifies the design of the antenna electronics and further reduces design complexity.

This approach is more affordable because of low-cost RF switching technology. In general, the array sampling techniques are also less expensive to implement than the RF combining methods. As the commutating switch samples the elements of the array, the commutation modulates the signal going to the receiver. The modulation arises from the phase differences between the antenna elements as the switch moves from one antenna to the next. The relative phase differences are related directly to the bearing angle.

Effectively, the known sampling process can be viewed from the perspective of the commutating switch electronically rotating the antenna and hence imposing a "Doppler spectral line" on the received signal. The spectral line is detected and processed to derive the bearing angle. This is the basis of pseudo-Doppler DF systems. Pseudo-Doppler DF systems are very good at determining bearing angles, however, they have three disadvantages. These problems have been addressed by U.S. patent application Ser. No. 07/998,391, entitled, "Method and Apparatus for Adaptively Determining the Bearing Angle of a Radio Frequency Signal", assigned and it is incorporated in its entirety.

Radio propagation conditions in the HF (High Frequency, 1-30 Mhz) portion of the spectrum often results in co-channel interference. In general, the interfering signals are not at the same transmission frequencies. But they are near each other in the spectrum. Consequently, when a receiver intercepts and detects the desired signal or signal of interest, it also receives and detects the interfering signal. Generally, the interfering signal is uncorrelated with the desired signal.

Direction Finding systems using small aperture antennas (antenna arrays) use amplitude, phase or doppler frequency methods to measure the bearing angle of a signal. When co-channel interference is present, all three parameters (amplitude, phase and doppler frequency) are corrupted. Correspondingly, since the bearing measurements are derived from these parameters, the bearing measurements are in error. The present invention addresses these problems.

SUMMARY OF THE INVENTION

A system is disclosed for reducing co-channel interference in a direction finding (DF) system. The DF system includes a direction finding antenna, a receiver coupled to the antenna and a processor for receiving signals from the antenna. The system for reducing co-channel interference comprises means for converting signals received from the receiver to digital signals, means for converting the digital signals into spectral signals and means for monitoring the spectral signals. The system further includes means for receiving the spectral signals that has at least one threshold input and has at least one spectrum window input. The spectral signal means provides a stop signal if interfering signal is greater than the threshold level and within the window input and provides a continue signal if the interfering signal is below the threshold level. The system also includes means for integrating the signals of interest from the processor responsive to the stop and continue signals.

In another aspect, the system includes a noise riding threshold that turns the integrating means on and off dependent upon the level of signal of interest.

In yet another aspect, the system includes exponential weighting of the signals of interest to improve the performance of the DF system.

DETAILED DESCRIPTION OF THE INVENTION

The present invention relates to an improvement in determining the bearing angle in the radio direction finding systems. The following description is presented to enable one of ordinary skill in the art to make and use the invention as provided in the context of a particular application and its requirements. Various modifications to the preferred embodiment will be readily apparent to those skilled in the art and the generic principles defined herein may be applied to other embodiments. Thus, the present invention is not intended to be limited to the embodiments shown but is to be accorded the widest scope consistent with the principles and novel features disclosed herein.

Figure 1:
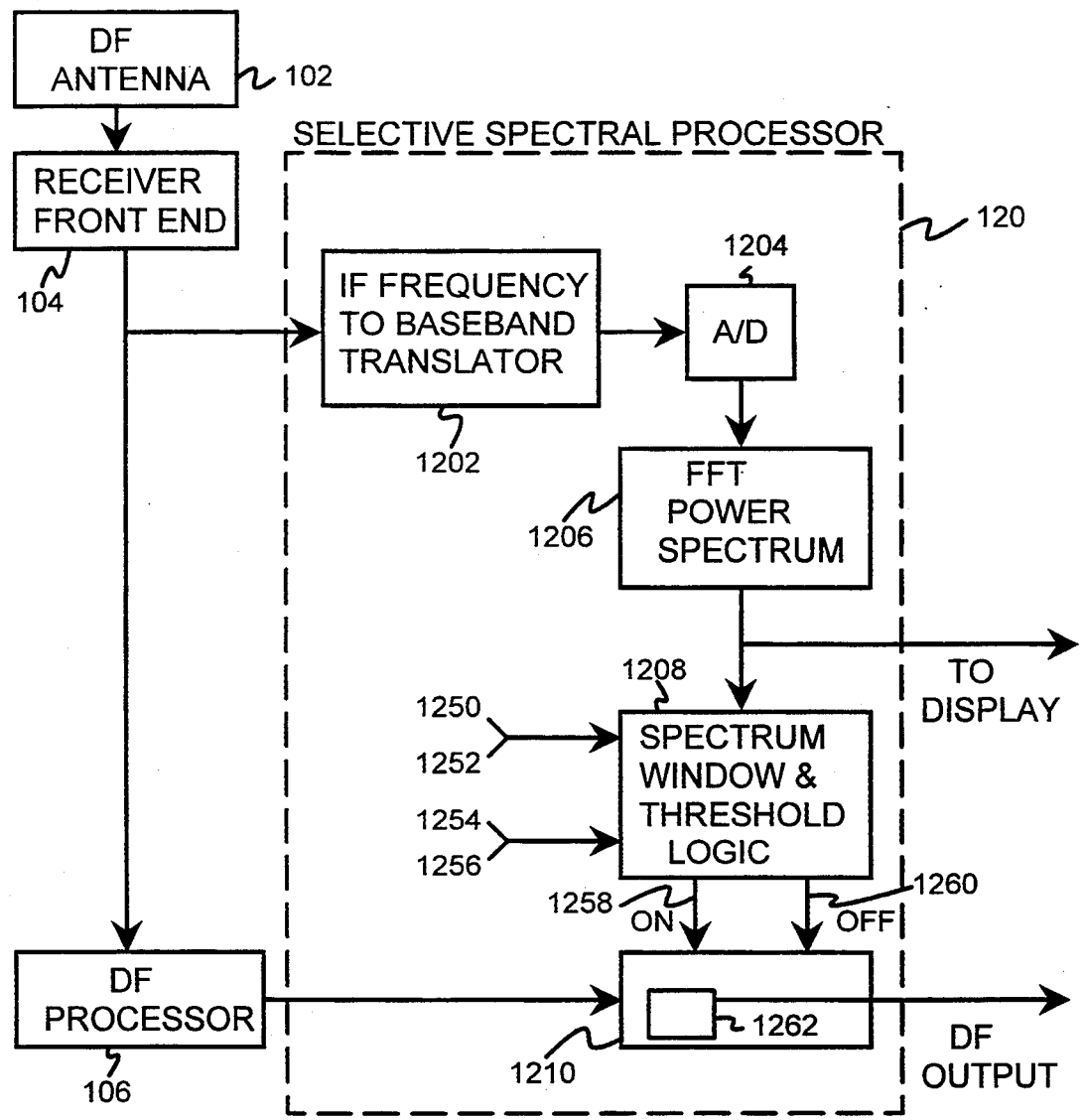
FIG. 1 is a functional block diagram of selective signal processing in accordance with the present invention.

FIG. 1 shows a functional block diagram of selective signal processor 120 (SSP) within the DF system architecture 100. The functional blocks within SSP 120 can be implemented either in hardware or in software and executed on a CPU or DSP unit.

SSP 120 is integrated into a DF system 100 which comprises a DF antenna 102, receiver 104, and DF processor 106 (adaptive interferometric processor). Such a processor is discussed fully in the previously mentioned, U.S. patent application Ser. No. entitled, "Method and Apparatus for Adaptively Determining the Bearing Angle of a Radio Frequency Signal".

The integrated signals from the antenna 102 are provided to the receiver 104. The intermediate frequency (IF) signals from the receiver 104 are provided to the DF processor 106 and to SSP 120. The DF processor 106 computes the bearing angle. However, SSP 120 only uses the bearing angles when co-channel interference is not present. The SSP 120 is comprised of an IF frequency to base band translator 1202, an analog to digital converter coupled to the translator 1202, and a power spectrum generator 1206. The power spectrum generator 1206 provides an output to the display. The power spectrum generator 1206 can be a Fast Fourier Transform (FFT) power spectrum generator in one embodiment or in a preferred embodiment the generator 1206 would comprise a bank of digital filters coupled to a plurality of square law detectors.

Figure 2:
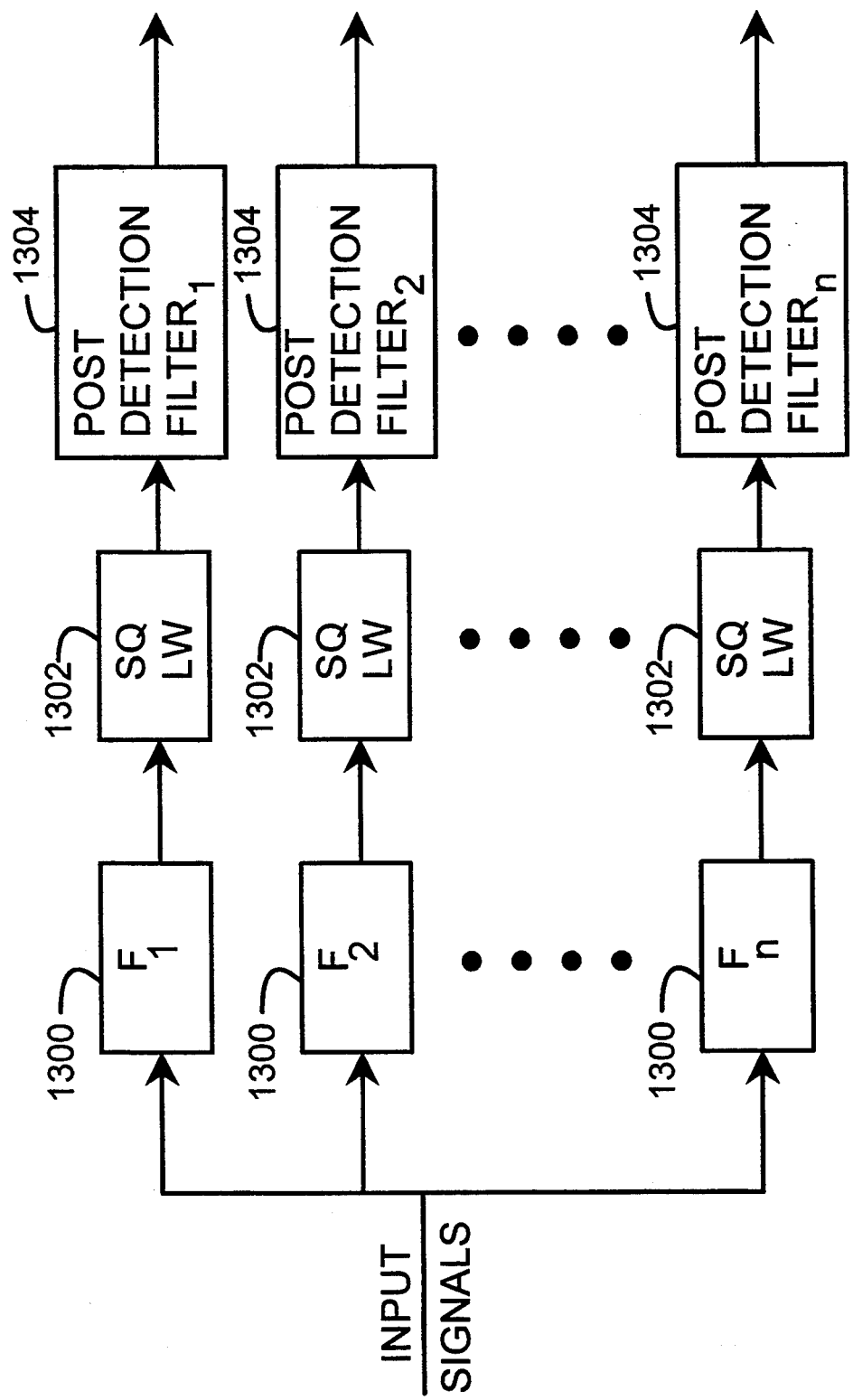
FIG. 2 is a block diagram of a preferred embodiment of the power spectrum generator.

Referring now to FIG. 2, what is shown is a power spectrum generator 1206, which comprises a plurality of bandpass filters 1300 coupled to a plurality of square law detectors 1302. Each of the bandpass filters 1300 receives an input signal and provides an output signal to one of the square law detectors 1302. The square law detectors 1302 in this embodiment are amplifiers. The signals from the detectors 1302 are then provided to post detection filters 1304 which provides integration of the signal. These signals can then be provided to the display as well as to the spectrum window and threshold logic 1208.

The SSP 120 operates in the following manner. The IF output from receiver 104 is provided to a frequency translator 1202, which moves the center frequency of the IF signal to baseband. The output of the translated signal is low pass filtered (not shown). An analog-to-digital converter 1204 converts the analog IF signal into a digital signal. Using the power spectrum generator 1206, the time domain digital signal is converted into a spectral signal and this output is used to generate the power spectrum.

Figure 3:
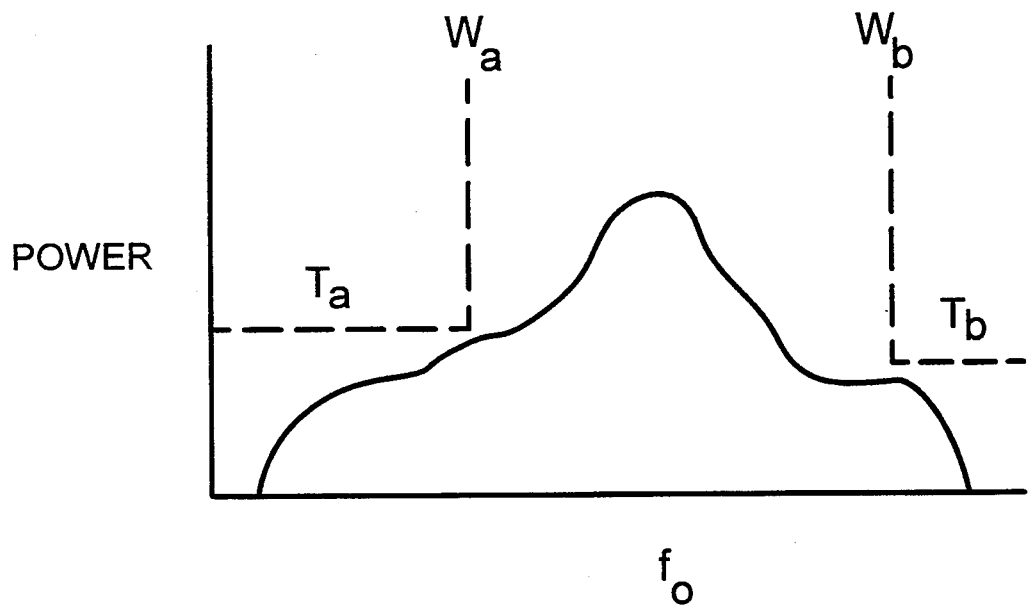
FIGS. 3 and 4 show spectral components associated with radio frequency signals.
Figure 4:
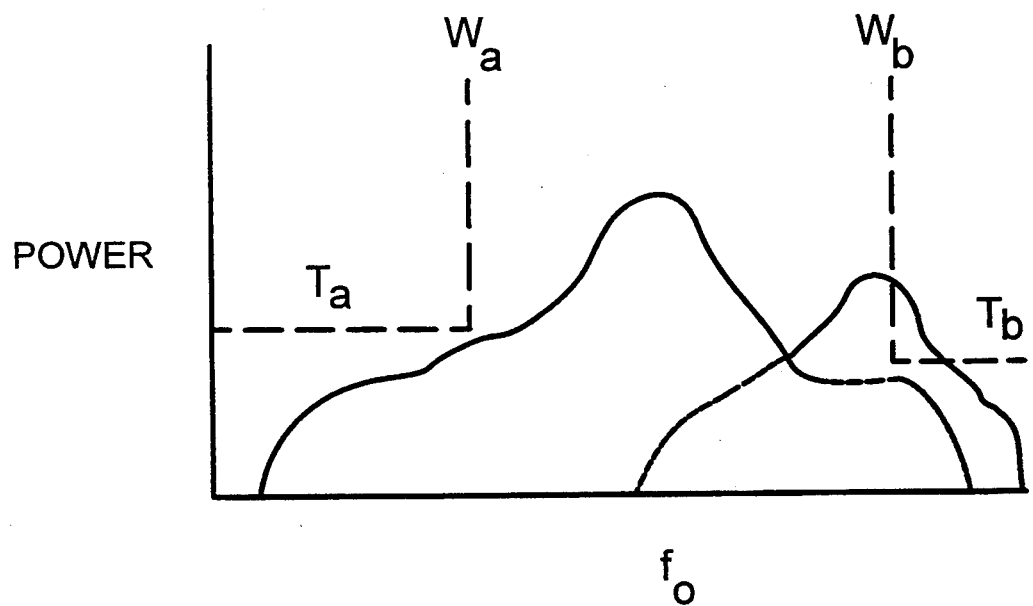

The power spectrum is displayed on a screen or display and updated at regular intervals. The operator monitors the display to determine the presence of co-channel interference. When interference is not present, the display contains a spectrum centered on the signal of interest (see FIG. 3). When interference is present, the spectrum contains additional spectral components that are clearly different (see FIG. 4 as an illustration).

In one embodiment, by monitoring the signal-of-interest and the interfering signal, the operator sets two independent threshold levels ($T_a$, $T_b$) via lines 1250 and 1252 and two independent spectral windows ($f < W_a$ and $f > W_b$) via lines 1254 and 1256 (see FIG. 1).

When an interfering signal appears above these thresholds and within the spectral windows, the window/threshold logic 1208 generates a stop signal via line 1260 for use in the integrator 1210. Otherwise, the logic 1208 generates a continue signal via line 1258 for the integrator 1210. The stop signal stops the integration while the continue signal allows the integration to proceed.

Figure 5:
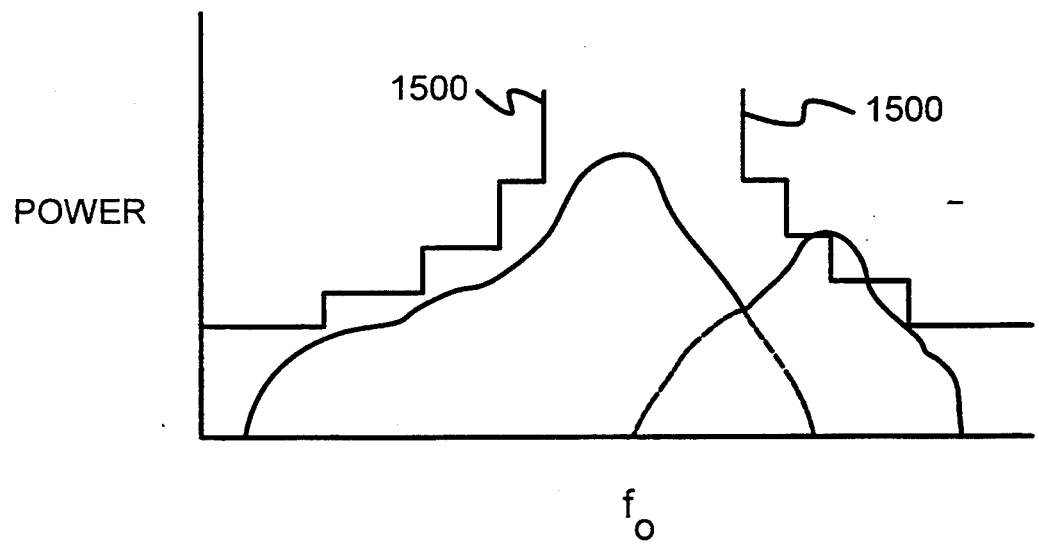
FIGS. 5 and 6 show different types of multiple threshold settings for detecting co-channel interference.
Figure 6:
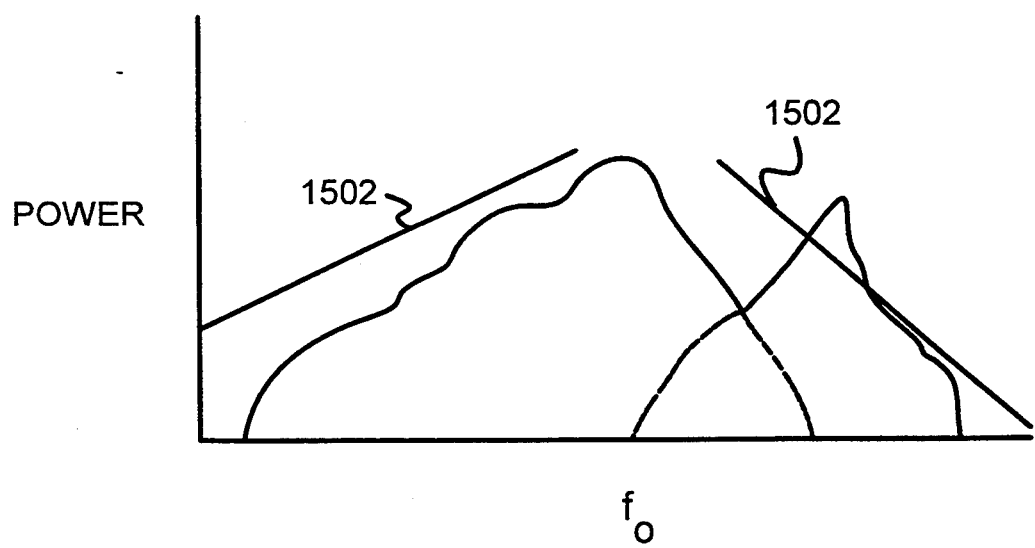

Referring now to FIGS. 5 and 6, what is shown are the power spectrums in which there is co-channel interface where multiple thresholds of power and frequency are set to provide for stair step like 1500 or straight line 1502 settings, respectively. These spectral windows and thresholds shown in these figures are illustrative of the many variations that could be used to detect co-channel interference. It should recognized by one of ordinary skill in the art that the spectral windows could be a variety of shapes and those shapes would be within the spirit and scope of the present invention.

Figure 7:
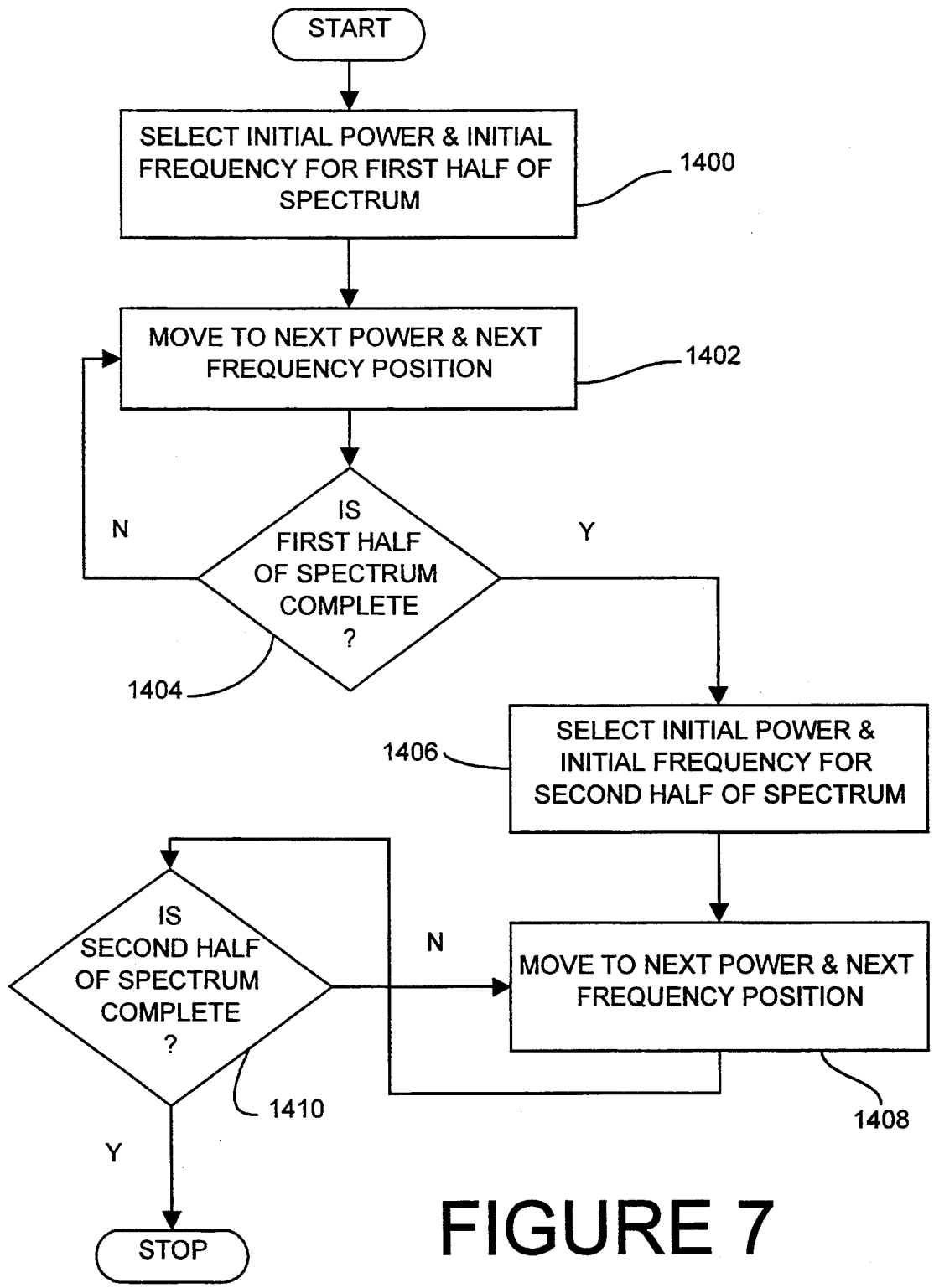
FIG. 7 is a flow chart of a system to set the thresholds shown in FIGS. 5 and 6.

Referring now to FIG. 7, what is shown is a flow chart of the operation of a system to set these types of spectral window and threshold. The spectrum window and threshold logic circuitry 1208 provides an input to an integrator 1210. The integrator 1210 also receives a signal from DF processor 106. In this embodiment, an initial power and frequency are selected for the first half of the spectrum via step 1400. Thereafter, the next power and frequency is selected via step 1402. This is repeated until the first half of the spectrum is complete, via step 1404. Thereafter, initial power and frequency are selected for the second half of the spectrum via step 1402. The next power and frequency is selected via step 1408. This step is repeated until the spectrum is complete via step 1410. Thereafter this routine is stopped. This routine can be accomplished manually or automatically.

The integrator 1210 uses exponential weighting, a noise riding threshold and the previously noted continue and stop signals. The integrator 1210 only integrates the DF bearing measurements when the signal-to-noise ratio of the DF bearing measurement exceeds a given threshold and when the continue signal is on. The former threshold setting is a noise riding threshold. The integrator 1210 uses exponential weighting methods. When the DF bearing measurement SNR is below the threshold or a stop signal is present, the integrator stops the integration process. When the DF bearing measurement signal to noise ratio exceeds the threshold and a continue signal is present, the integrator 1208 then averages the DF bearing measurement from a DF processor.

Using an exponential weighting algorithm, the integrator averages the data from the DF processor 106. An exponential weighting algorithm is utilized rather than, for example, box car averaging, since exponential weighting does not have sidelobes in the spectral domain. Experience has shown that the exponential weighting provides better performance than box car averaging when the integrator is being turned on and off by the start and stop signals of the window threshold logic circuitry 1208. The performance differences are associated with the sidelobe characteristics.

Exponential weighting can be viewed as a process that uses all previous measurements to form the average. But it weighs the most recent measurements more strongly than past measurements as shown in FIG. 8 (item a).

Figure 8:
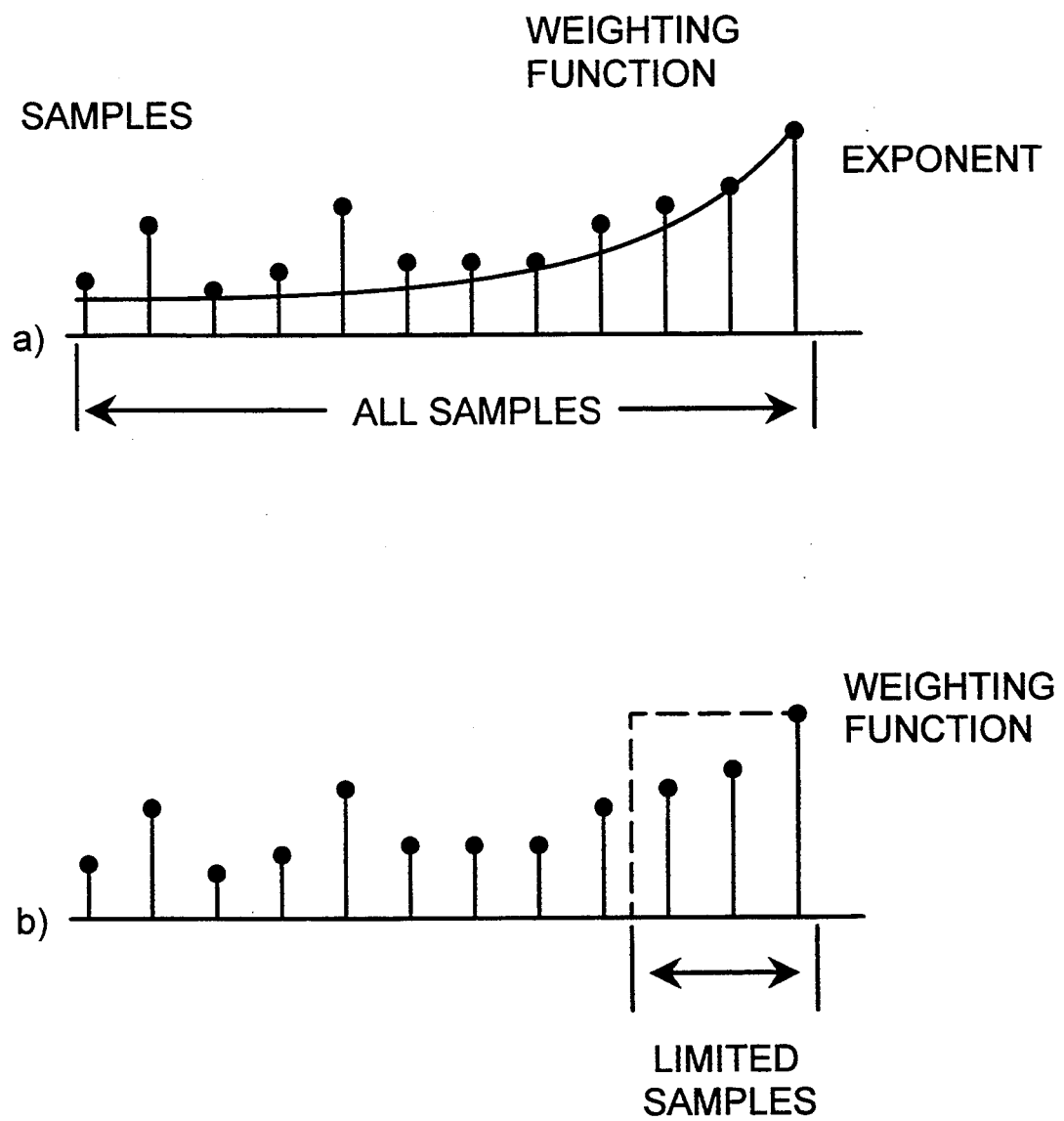
FIG. 8 is a comparison of exponential weighting to box car weighting of RF signals.

In contrast, box car measurements weight all measurement equally as shown in FIG. 8 (item b). Also, the box car algorithm does not use all previous measurements. The measurements are limited to the integrator window. Therefore, the exponential weighting has proven to be very effective in bearing angle determination.

Another problem solved by the present invention relates to noise. It is known that all measurement processes contain noise. When DF bearing measurements are made, noise is present on the measured output as well. The integrator 1210 (FIG. 1) smooths out the effects of noise. But when measurements are made during the times that a signal is not present, the output of the DF processor is noise. If the integrator 1210 included these more noisy samples, the integrator output would be corrupted.

A noise riding threshold detector 1262 present within the integrator 1210 provides an effective method for sensing the presence of the signal of interest. When the signal is present, the integrator 1210 is turned on. When it is not there, the integrator 1210 is turned off by the processor. One of ordinary skill in the art recognizes that the threshold detector 1262 could be a comparator or the like. The concept of turning the integrator 1210 on and off by the detector 1262 is identical to the process of turning the integrator 1210 on and off from the spectrum Window/Threshold Logic circuit 1208.

In this embodiment, a noise riding threshold is a threshold level that changes automatically. As the noise levels change, the threshold remains above the noise at a predefined level. When the signal is present, the signal level exceeds the threshold which results in turning the integrator 1210 on. Correspondingly, when the signal is not present, the signal level is now below the threshold and results in turning the integrator 1210 off.

A noise riding threshold is used instead of a fixed threshold because of the statistical nature of the noise environment in different portions of the radio spectrum. A fixed threshold produces estimates that are corrupted occasionally by noise that exceeds the threshold. Also the fixed threshold does real assessment for the statistical nature of the noise in the radio spectrum.

Through the present invention, a system has been developed for selectively processing signals of interest and to severely limit co-channel interference. The present invention makes use of the uncorrelated properties of frequency, amplitude and time of the interfering signal to overcome the degrading effects of co-channel interference on Direction Finding (DF) systems.

Although the present invention has been described in accordance with the embodiments shown in the figures, one of ordinary skill in the art would readily recognize that there could be variations to those embodiments and those variations of the present invention. Accordingly, many modifications may be made by one of ordinary skill in the art without departing from the spirit of the present invention, the scope of which is defined solely by the appended claims.

We claim:

1. An apparatus for reducing co-channel interference in a direction finding (DF) system, the DF system including a DF antenna, a receiver coupled to the antenna and a processor for receiving signals from the receiver; the apparatus comprising:
   means for converting analog signals from the receiver to digital signals;
   means for converting the digital signals to spectral signals; the digital signal converting means including a plurality of bandpass filter means and a square law detecting means coupled to the band pass filter means;
   means for monitoring the spectral signals for interfering signals and signals of interest;
   means for receiving the spectral signals; the spectral signal receiving means having at least one threshold input and having at least one spectrum window input, the spectral signals receiving means providing a stop signal if the interfering signal is greater than the threshold level and within the spectrum and a continue signal, if the interfering signal is less than the threshold level and;
   means for integrating the signals of interest from the processor responsive to the stop and continue signals.

2. The apparatus of claim 1 in which the integrating means integrates in accordance with an exponential weighting function.

3. The apparatus of claim 1 in which there are two threshold inputs and two spectrum window inputs.

4. The apparatus of claim 1 in which further comprises means for stopping the integrating means if the signal of interest is not above a noise threshold.

5. The apparatus of claim 2 which further includes means for translating the intermediate frequency signal received from the receiver into a baseband signal, the translating means providing the baseband signal to the digital to analog converting means.

6. A method for reducing co-channel interference in a direction finding (DF) system, the DF system including a DF antenna, a receiver coupled to the antenna and a processor for receiving signals from the receiver; the method comprising the steps of:
   (a) converting analog signals from the receiver to digital signals;
   (b) filtering the digital signals;
   (c) square law detecting the filtered signals to provide spectral signals;
   (d) monitoring the spectral signals for interfering signals and signals of interest;
   (e) receiving the spectral signals;
   (f) providing at least one threshold input signal;
   (g) providing at least one spectrum window input;
   (h) providing a stop signal if the interfering signal is greater than the threshold level and within the spectrum;
   (i) providing a continue signal, if the interfering signal is less than the threshold level; and
   (j) integrating the signals of interest from the processor responsive to the stop and continue signals.

7. The apparatus of claim 6 in which the integrating step (i) integrates in accordance with an exponential weighting function.

8. The method of claim 6 in which there are two threshold inputs and two spectrum window inputs.

9. The method of claim 6 which further comprises the step of stopping the integrating means if the signal of interest is not above a noise threshold.

10. The method of claim 6 which further comprises the steps of:
    (a) translating the intermediate frequency signal received from the receiver into a baseband signal; and
    (b) providing the baseband signal.

11. An apparatus for reducing co-channel interference in a direction finding (DF) system, the DF system including a DF antenna, a receiver coupled to the antenna and a processor for receiving signals from the receiver; the apparatus comprising:
   analog to digital converter for converting intermediate frequency signals from the receiver to digital signals;
   power spectrum generator for converting the digital signals to spectral signals;
   a display for monitoring the spectral signals for interfering signals and signals of interest;
   spectrum window and threshold logic circuit for receiving the spectral signals; the spectrum window and threshold logic circuit having at least one threshold input and having at least one spectrum window input, the spectrum window and threshold logic circuit providing a stop signal if the interfering signal is greater than the threshold level and within the spectrum and a continue signal, if the interfering signal is less than the threshold level;
   a control means coupled to the logic circuit which includes means for selecting an initial power and frequency setting for a spectral window and threshold;
   means coupled to the selecting means for moving to a next power and frequency setting;
   means coupled to the moving means to complete spectral window and threshold settings for the spectrum; and an integrator for integrating the signals of interest from the DF processor responsive to the stop and continue signals.

12. The apparatus of claim 11 in which the integrator integrates in accordance with an exponential weighting function.

13. The apparatus of claim 11 in which there are two threshold inputs and two spectrum window inputs.

14. The apparatus of claim 11 in which further comprises a noise riding threshold for stopping the integrating means if the signal of interest is not above a noise threshold.

15. The apparatus of claim 11 which further includes IF frequency to baseband translator for translating the intermediate frequency signal received from the receiver into a baseband signal, the translating means providing the baseband signal to the digital to analog converter.

* * * * *